Jan. 27, 1931.  U. A. WHITAKER  1,790,186
TRAIN PIPE COUPLING VALVE MECHANISM
Filed Nov. 15, 1928   2 Sheets-Sheet 1
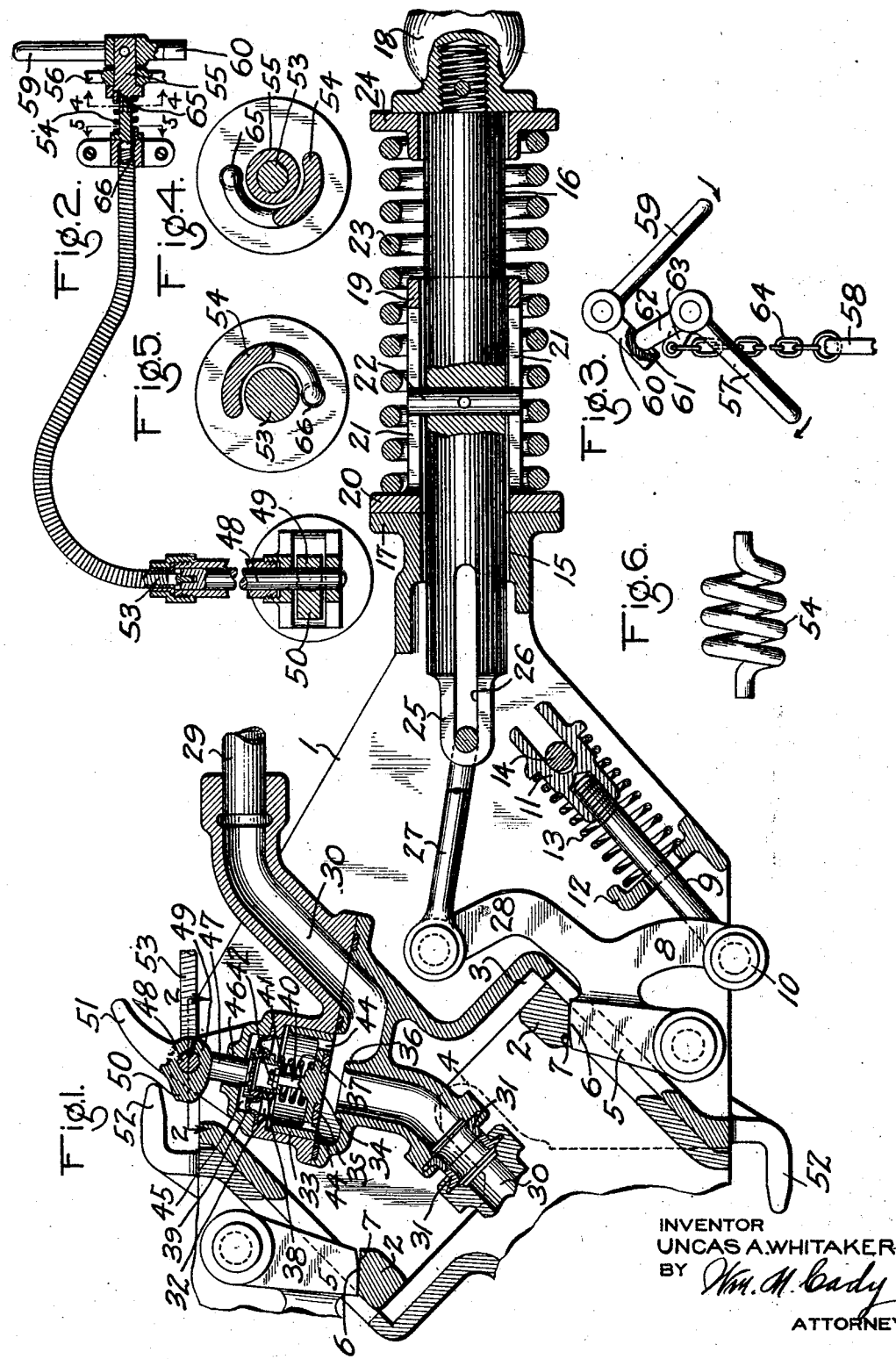
INVENTOR
UNCAS A. WHITAKER
BY Wm. M. Cady
ATTORNEY

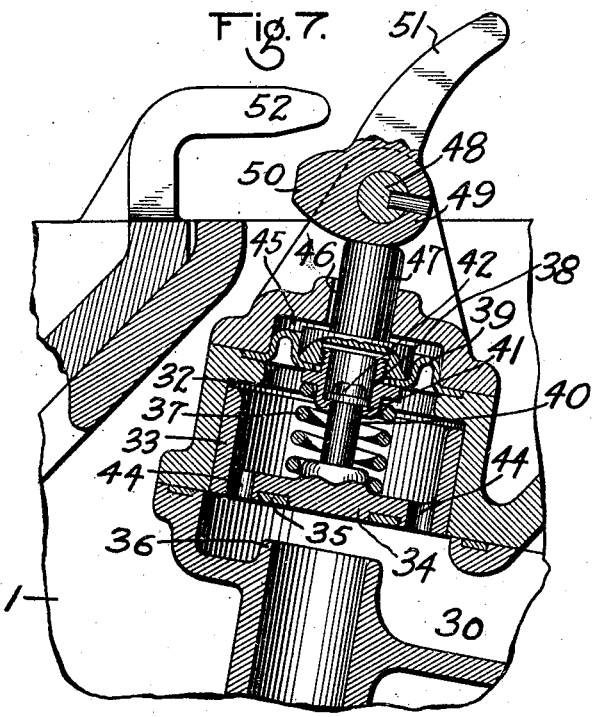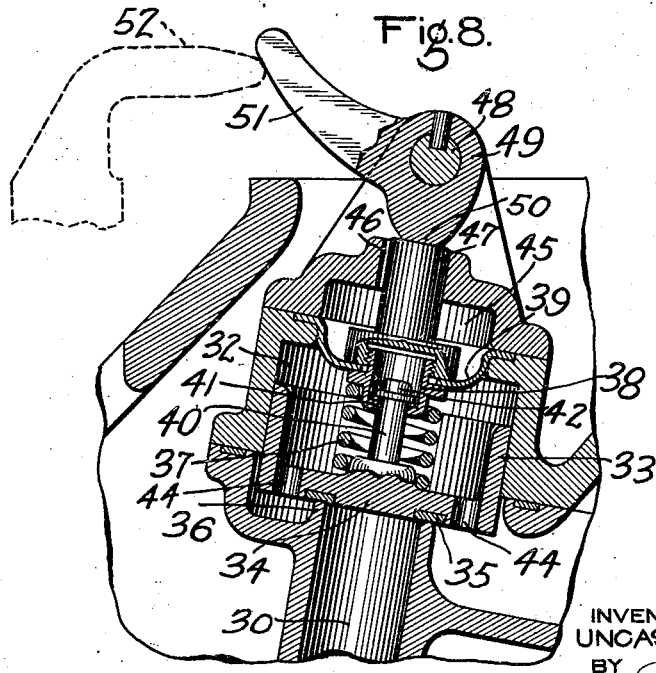

Patented Jan. 27, 1931

1,790,186

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

TRAIN-PIPE-COUPLING VALVE MECHANISM

Application filed November 15, 1928. Serial No. 319,498.

This invention relates to automatic train pipe couplings, and more particularly to the type known as the tight or rigid lock coupling.

An object of the invention is to provide a train pipe coupling of the above-mentioned type with means for controlling communication through the brake pipe so that when the cars are intentionally separated the brake pipe will be closed, but should the cars be unintentionally separated the brake pipe will be open to the atmosphere to effect an emergency application of the brakes.

Another object of the invention is to provide a train pipe coupling with means for restricting the communication through the brake pipe when an empty section of train is being coupled to a charged train section so as not to produce a too rapid drop in the pressure of the fluid in the brake pipe of the charged section.

Another object of the invention is to provide a train pipe coupling in which communication through the brake pipe of the coupling is controlled by means of a poppet valve adapted to be manually actuated when the cars are uncoupled and to be automatically actuated when the cars are being coupled.

Another object of the invention is to provide a train pipe coupling having a brake pipe passage controlled by a poppet valve, means being included for preventing the closing of the valve when the coupling is coupled to a counterpart coupling.

Another object of the invention is to provide a train pipe coupling wherein the valve for controlling communication through the brake pipe is actuated by mechanism subject to stored up pressure.

Another object of the invention is to provide an improved type of train pipe coupling of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings: Figure 1 is a longitudinal section of an automatic train pipe coupling embodying the invention, showing the same in coupled position; Fig. 2 is a section taken on the line 2—2 of Fig. 1, showing the valve actuating mechanism; Fig. 3 is an elevation, partly in section, of the coupling pin unlatching means, showing the same associated with the valve mechanism actuating lever; Fig. 4 is a section taken on the line 4—4 of Fig. 2, showing the manner of anchoring one end of the drive shaft tensioning spring; Fig. 5 is a section taken on the line 5—5 of Fig. 2, showing the manner of anchoring the other end of the drive shaft tensioning spring; Fig. 6 is a detail view of the drive shaft tensioning spring; Fig. 7 is an enlarged view of a portion of the structure shown in Fig. 1; and Fig. 8 is a view similar to Fig. 7 showing the valve seated so as to close the open end of the brake pipe when the coupling is uncoupled.

Train pipe couplings of the type known as the tight or rigid lock coupling, are shown for example, in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge an empty section of train from a charged section.

By the present invention, means are provided by which the brake pipe valves of the coupling heads are actuated by the car unlatching mechanism to close the valves when the cars are uncoupled, the valve actuating mechanism being operated automatically to open the valves when the cars are coupled, and being prevented from operating to cause the closing of the valves should the cars be unintentionally uncoupled.

Referring to the drawings, the automatic train pipe coupling head 1 comprises a projecting nose 2 adapted to engage in a recess 3 of a counterpart coupling head. The head 1 is also provided with a hooked portion 4 adapted to engage and interlock with a corresponding hook portion of a counterpart coupling head, in the manner fully described in the above-mentioned Westinghouse patent.

The coupling head is provided with a pivoted cam or latch lever 5 having a cam surface 6 for engaging a face 7 of a counterpart coupling head.

The lever 5 carries an arm 8 to which a rod 9 is pivotally connected by a pin 10.

Secured to the outer end of the rod 9 is a forked cross head 11, and interposed between said cross head and a fixed abutment 12, is a coil spring 13. A guide pin 14, secured to the coupling head, is adapted to engage in the fork of the cross head 11.

The rear end of the coupling head is formed with an opening 15 which constitutes a guide for the forward end of a stem 16, the end face of the coupling head, around the opening, being extended to provide a flange 17.

The stem 16 has its rear end provided with a ball section 18 adapted to be mounted in a socket (not shown) carried by the car.

Slidably mounted on the stem 16 is a sleeve 19 having one end flanged at 20, for abutting the flange 17. The sleeve 19 is formed with diametrically disposed longitudinal slots 21 into which extend the projecting ends of a pin 22 that is passed transversely through the stem 16.

A coil spring 23 encircles the stem 16 and the sleeve 19, one end of the spring bearing against the flange 20, while the opposite end thereof bears against a collar 24 at the inner end of the stem.

The spring 23 is normally under initial compression which tends to hold the head 1 extended with respect to the stem 16. However, when the coupling is coupled to a counterpart coupling head, the head 1 will be telescoped on the stem 16, thereby compressing the spring 23 (see Fig. 1).

The front end of the stem 16 is provided with an extended portion 25 having a longitudinal slot 26, and engaging in said slot is a link 27 which is pivotally connected to an arm 28 carried by the cam lever 5. As shown in Fig. 1, the slot 26 may extend for a distance into the main body of the stem 16, so as to increase the length of the slot with respect to the length of the portion 25.

The coupling head 1 contains one or more conduits or passages. In the present instance it is shown as having a conduit 30, to the rear end of which is connected the end of a brake pipe 29, while to the forward or nose end of which is mounted a gasket 31 adapted to abut the corresponding gasket on the other coupling, and make a fluid tight joint when the coupling heads are coupled together.

Communicating with the conduit 30, is a chamber 32 containing a poppet valve, which may be in the form of a valve piston 33 having a head 34 provided with a gasket 35 for engaging with a seat rib 36 formed in the conduit 30, when the coupling head is uncoupled, so as to close the open end of the conduit 30 to prevent the escape of fluid therefrom.

The side of the valve piston 33, opposite to the face thereof carrying the gasket 35, is subject to the pressure of an expansible coil spring 37, the opposite end of which bears against a cap 38 mounted on one side of a diaphragm 39.

The valve piston 33 is connected to the diaphragm 39 by means of a stem or rod 40 which projects from the valve piston and extends through an opening 41 in the end wall of the cap 38. The end of the stem within the cap has a head 42 for limiting the relative movement of the valve piston 33 with respect to the diaphragm 39. However, the construction is such that the cap 38 can be moved inwardly of the valve piston 33, through the action of the diaphragm 39, when the valve piston is seated against the seat rib 36, and this action will compress the spring 37 which will force the valve piston tightly against its seat.

On one side, the diaphragm 39 is subject to the pressure of fluid which is admitted to chamber 32, through a plurality of ports 44 formed in the head of the valve piston 33, while on the other side, the diaphragm is subject to atmospheric pressure admitted to chamber 45 through an opening 46 formed in the end wall of the valve casing.

The side of the diaphragm opposite to the side having the cap 38, carries a stem 47 which is slidably mounted in the opening 46 and which projects a suitable distance beyond the end wall of the valve casing.

Fixed to a shaft 48 mounted in the coupling head 1, is an actuator 49 for the stem 47. This actuator is provided with a projecting portion constituting a cam 50 which has a flattened nose for engaging the end of the stem 47, in a manner to be described to retain the stem depressed. The actuator 49 is also provided with an arcuately formed arm 51 which is disposed at an angle to the cam 50.

When the coupling head 1 is coupled to a counterpart coupling, the angular movement of the actuator 49, in a direction that will force the stem 47 inwardly to the end of its traverse, will be prevented by a stop in the form of a nose 52 projecting from the counterpart coupling into the path of the arm 51.

The shaft 48 is operated by a flexible drive shaft 53, one end of which is connected to the end of the shaft 48, while the opposite end thereof is connected through a coil spring 54 to the end of a shaft 55 mounted in a bearing 56 on the end of the car. One end of the spring 54 is anchored in an opening 65 on the end of shaft 55, while the other end of the spring is anchored in an opening 66 formed on the drive shaft 53, near the end thereof. In this way, when the shaft 55 is rotated, the force will be transmitted through the spring 54 to the drive shaft 53, and should shaft 53 be prevented from rotating, continued rotation of the shaft 55 will coil the spring tighter, as will be readily understood.

The shaft 55 is preferably disposed at a point contiguous to a lever 57 used for releasing the car coupling locking pin 58, and this shaft is adapted to be manually operated by a lever 59.

The lever 59 has an arm 60 projecting therefrom, and this arm is formed with a recess 61 for receiving the nose end of an arm 62 projecting from the hub of the lever 57 (see Fig. 3), whereby the levers 57 and 59 will be interlocked when the cars are uncoupled.

The lever 57 is also provided with another arm 63 which is connected to the coupling pin 58 by means of a flexible element, such for instance as a chain 64.

In operation, when the cars are intentionally uncoupled, the car couplers are unlocked by manipulating the lever 57 to lift the pin 58, and when the trainman is actuating lever 57 with one hand, the lever 59 is manipulated with the other hand to effect the closing of the brake pipe in the manner to be described, this action placing the nose end of the arm 62 in the recess 61 to interlock the levers 57 and 59 together (see arrows Fig. 3).

After the pin 58 has been lifted and as the cars separate, the train pipe coupling heads 1 will remain coupled and locked together until the cars have moved apart sufficiently to pull the coupling heads 1 outwardly of the stems 16 until further longitudinal movement is prevented by the pins 22 engaging the ends of the slots 21.

This action will also pull the links 27 to the outer end of the slots 26, whereupon the levers 5 will be swung backwardly out of engagement with the faces 7, thereby permitting the automatic unlocking of the coupling heads. When the coupling heads separate, the springs 23 will maintain the parts in an extended position, ready for coupling up.

When the lever 59 is actuated during the uncoupling operation, the rotation of shaft 55 will be transmitted through spring 54 to the drive shaft 53 and consequently the actuator 49 will be rotated until arm 51 strikes the tip of the nose 52 of the counterpart coupling and further movement of the actuator prevented.

However, as the angle of rotation of the shaft 55 in positioning the recess 61 on the arm 60 so that it will receive the nose of the arm 62 when the levers 57 and 59 are actuated to uncouple the cars, is greater than the angle of rotation of the actuator 49, this excess of rotation of the shaft 55 will be absorbed by the spring 54 which will be coiled tighter.

Therefore, when the coupling heads 1 separate and the nose 52 is thus moved away from the path of the arm 51, the force of the stored up pressure of spring 54 will be released, and the flexible shaft 53 will be rotated. This action will rotate the cam 50 until its flattened extremity engages the end of the stem 47. In this way the stem 47 is depressed and this action will move the diaphragm 39 downwardly.

When the diaphragm is thus moved downwardly, its movement will be transmitted through spring 37 to the valve piston 33. Continued rotation of the cam 50 will therefore gradually depress the stem 47, which in turn forces the diaphragm and the valve piston downwardly until the valve piston engages the seat rib 36.

When the flattened extremity of the cam 50 engages the end of the stem 47, the parts of the valve device will be positioned as shown in Fig. 8. The valve piston 33 will be pressed against the seat rib 36 by the force exerted by spring 37. As the shaft 48 is disposed in the same plane as the stem 47, when the flattened extremity of the cam 50 is in engagement with the end of the stem, relative movement of the actuator 49 with respect to the valve piston 33 and diaphragm 39 will be prevented, and the parts will remain in locked position until the actuator is again rotated.

When cars are brought together for coupling up, the projecting nose 2 of one train pipe coupling enters the recess 3 of the counterpart coupling and in this movement, the cam lever 5 is forced rearwardly by the nose 2. The hooked portions 4 of the two couplings become interlocked through the relative lateral and longitudinal movement and the gaskets 31 meet, so that the train pipe openings are connected together.

When the train pipe coupling head on each car moves rearwardly on the stem 16, the sleeve 19 will be carried with it, thereby compressing the spring 23 between the flange 20 and the collar 24 which are brought closer together.

When the coupling head 1 and the stem 16 are thus telescoped together, the U-shaped link 27 will be carried rearwardly of the slot 26 and the pressure of spring 13 will force the lever 5 outwardly towards the nose 2, so that the cam face 6 engages the face 7 of the counterpart coupling head and locks the two coupling heads tightly together.

Inasmuch as the coupling heads will be held telescoped on the stems 16 during the time the car couplers are locked together, the loop end of the links 27 will not engage the outer end of the slots 26. Therefore, the levers 5 will be retained in locked position by the pressure exerted by the springs 17, and these latches will remain in such position as long as the cars remain coupled together by virtue of the lost motion provided by the slotted connections between the several parts.

When the coupling heads 1 are brought together for coupling up, the end of the nose 52 engages the arm 51 of the actuator on the counterpart coupling and the arm is swung upwardly, thereby unseating the flattened end of the cam 50 from the stem 47. When the interlocked parts of the valve actuating mechanism are thus unlocked, and as the cam 50 turns to the position shown in Fig. 7, the pressure of the fluid in the charged section of train acts on the diaphragm 39 to force the same upwardly.

During this upward movement of the diaphragm, the cap 38 will engage the head 42 of the stem 40, and in this way the valve piston 33 will be lifted from the seat rib 36, thereby permitting the fluid in the charged section to flow into the uncharged section of the train.

In order to restrict the amount of fluid flowing from the charged brake pipe 29 into the adjoining uncharged brake pipe section, handle 59 can be turned to rotate the shaft 53, which in turn will rotate the actuator 49 and thereby swing the arm 51 into engagement with the end of the nose 52 of the counterpart coupling.

When the actuator 49 is rotated, the cam 50 will depress the stem 47 and consequently the diaphragm 39 and the valve piston 33 will be moved downwardly so that the lower face of the valve piston will be disposed only a slight distance from the seat rib 36, thereby providing a restricted opening in the conduit 30 for restraining the amount of fluid flowing therethrough.

After the fluid pressure has been built up in the uncharged section an amount substantially equal to the pressure of the fluid in the charged section, the handle 59 can be turned to swing the actuator 49 to the position shown in Fig. 1, whereupon the pressure of the fluid in chamber 32 will force the diaphragm 39 and the valve piston 33 upwardly to permit an unrestricted flow of fluid through the conduit 30.

If the cars are unintentionally separated, the actuator 49 will not be manually operated to depress the diaphragm 39, and consequently the valve piston 33 will remain unseated, thereby permitting an unrestricted flow of the brake pipe fluid through the open end of the conduit 30 to effect a quick reduction in the brake pipe pressure and consequently an emergency application of the brakes. This is possible, because no restriction or choke is provided except that formed by the limited movement of the valve piston 33 from the seat rib 36 which is obtained only in the manner heretofore described when the coupling is coupled to a counterpart coupling. Therefore, the pressure over the entire lower face of the valve piston 33 will reduce at the same time. Ports 44 are of such flow area as to permit pressure from chamber 32 to reduce with the pressure on the lower face of valve piston 33. The pressure on the valve piston thus remains equal and the pressure on the diaphragm 39 is therefore permitted to hold said valve piston in the fully opened position, thereby permitting an unrestricted flow of the brake pipe fluid through the open end of the conduit 30 when the coupling heads are pulled apart.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with an automatically operated train pipe coupling having a valve for controlling the flow of fluid through a passage, of means for manually closing the valve when the coupling is being uncoupled from a counterpart coupling, and means for limiting the movement of the valve while the coupling is coupled to a counterpart coupling.

2. The combination with an automatically operated train pipe coupling having a poppet valve for controlling the flow of fluid through a conduit, of means for manually closing the valve when the coupling is being uncoupled from a counterpart coupling, and means on the counterpart coupling for limiting the movement of the valve while the coupling is coupled to a counterpart coupling.

3. The combination with a coupling having a train pipe passage and a valve chamber communicating with the passage, of a valve piston mounted in the chamber and having a seat for closing the passage, a diaphragm, flexible means connecting the valve piston and diaphragm, and means for moving the diaphragm in a direction that will force the valve piston toward its seat.

4. The combination with a coupling having a train pipe passage and a valve chamber communicating with the passage, of a valve piston mounted in the chamber for controlling communication through the passage, means actuated by the pressure of the fluid in the passage for retaining the valve piston unseated when the coupling is connected to a counterpart coupling, manually operable means for moving the valve piston toward its seat when the coupling is being uncoupled from a counterpart coupling, and means for retarding the seating of the valve piston until the coupling has separated from the counterpart coupling.

5. An automatic coupling having a train pipe passage, and means for controlling communication through the passage including a valve piston, a diaphragm subject to the pressure of the fluid in the passage for retaining the valve piston in an open position, and manually actuated means for causing said diaphragm to seat the valve piston.

6. An automatic coupling having a train pipe passage, and means for controlling communication through the passage including a valve piston normally retained unseated, means for seating said valve piston when the coupling is uncoupled from a counterpart coupling, and means for retaining the valve piston seated including a cam lock.

7. In a train pipe coupling, the combination with a train pipe and a valve for controlling communuication through said pipe, of mechanism subject to stored up pressure for closing said valve upon separation of counterpart couplings, and manually operated means for storing up pressure in said mechanism.

8. In a train pipe coupling, the combination with a train pipe and a valve for controlling communication through said pipe, of a yielding pressure means, mechanism operated by the pressure exerted by said means for closing said valve, and manually operated means for applying pressure to said yielding pressure means.

9. In a train pipe coupling, the combination with a train pipe and a valve for controlling communication through said pipe, of a yielding pressure means, mechanism operated by the pressure exerted by said means for closing said valve, manually operated means for storing up pressure in said yielding pressure means, a car coupler unlocking device, and means operated by said device for holding said manually operated means in its pressure storing position.

10. A coupling having a train pipe passage, a valve for controlling communication through the passage, and means for actuating the valve to close the passage, including a lever and a flexible drive shaft resiliently connected to the lever.

11. A coupling having a train pipe passage, a valve for controlling communication through the passage, and means for actuating the valve to move the same in a direction for closing the passage, including a cam, a flexible drive shaft, and a lever resiliently connected to the drive shaft.

12. A coupling having a train pipe, a valve for controlling communication through the pipe, and means for actuating the valve to move the same in a direction for closing the pipe, including a cam, a flexible drive shaft, a lever, and resilient torsion means between the lever and the drive shaft.

In testimony whereof I have hereunto set my hand, this 12th day of November, 1928.

UNCAS A. WHITAKER.